US007259815B2

(12) United States Patent
Yang et al.

(10) Patent No.: US 7,259,815 B2
(45) Date of Patent: Aug. 21, 2007

(54) TWO-WAY TRANS-REFLECTIVE DISPLAY

(75) Inventors: Sen Yang, Palatine, IL (US); Robert B. Akins, Palatine, IL (US); Robert D Polak, Lindenhurst, IL (US); Zhiming Zhuang, Buffalo Grove, IL (US)

(73) Assignee: Motorola Inc., Schaumburg, IL (US)

( * ) Notice: Subject to any disclaimer, the term of this patent is extended or adjusted under 35 U.S.C. 154(b) by 352 days.

(21) Appl. No.: 10/975,584

(22) Filed: Oct. 28, 2004

(65) Prior Publication Data

US 2006/0092355 A1    May 4, 2006

(51) Int. Cl.
*G02F 1/1333* (2006.01)
*G02F 1/1335* (2006.01)
*G02F 1/13* (2006.01)

(52) U.S. Cl. .................. 349/114; 349/110; 349/113; 349/198; 359/267; 359/272; 445/566

(58) Field of Classification Search ............... 349/114, 349/198, 113, 110; 445/566; 359/267, 272
See application file for complete search history.

(56) References Cited

U.S. PATENT DOCUMENTS

| 5,337,068 | A |   | 8/1994 | Stewart et al. |
| 5,737,036 | A |   | 4/1998 | Kanai et al. |
| 5,764,329 | A | * | 6/1998 | Chen et al. .................. 349/193 |
| 5,856,819 | A |   | 1/1999 | Vossler |
| 6,567,063 | B1 |  | 5/2003 | Okita |
| 6,574,487 | B1 |  | 6/2003 | Smith et al. |
| 6,744,416 | B2 |  | 6/2004 | Mizutani et al. |
| 2003/0063243 | A1 |   | 4/2003 | Roosendaal et al. |
| 2003/0160919 | A1 | * | 8/2003 | Suzuki et al. ............... 349/113 |
| 2004/0070711 | A1 |   | 4/2004 | Wen et al. |
| 2004/0189901 | A1 |   | 9/2004 | Kim et al. |
| 2005/0088593 | A1 | * | 4/2005 | Yamauchi .................... 349/114 |

FOREIGN PATENT DOCUMENTS

| JP | 2002-357825 A | 12/2002 |
| WO | WO 02/071131 A2 | 9/2002 |
| WO | WO 2004/040361 A1 | 5/2004 |

* cited by examiner

*Primary Examiner*—Huyen Ngo
(74) *Attorney, Agent, or Firm*—Hisashi D. Watanabe (57) ABSTRACT

A two-way trans-reflective display pixel (100) having two viewable sides (102, 104) is disclosed. The two-way trans-reflective display pixel has a first transparent layer (106), a second transparent layer (108), and light modulating medium (110) sandwiched between them. Both the first and second transparent layers (106, 108) have light reflectors (132, 136) and light absorbers (130, 134), which allow light entering from either viewable sides (102, 104) to partially reflected, partially absorbed, and partially transmitted, allowing an image to be viewable from both viewable sides (102, 104). A two-way trans-reflective display (402) comprising a plurality of two-way trans-reflective display pixels (100) and a transparent light source (412) is also disclosed. The transparent light source (412) provides color light, and enables an image from the two-way trans-reflective display (402) to be viewable in color from both first and second viewable sizes (418, 602).

18 Claims, 7 Drawing Sheets

TWO-WAY TRANS-REFLECTIVE DISPLAY

FIELD OF THE INVENTION

The present invention generally relates to a display, and more specifically to a bi-directionally viewable display being reflectively and transmissively viewable.

BACKGROUND OF THE INVENTION

As portable electronic devices become smaller, there is an increasing demand for such devices to be equipped with displays that are also smaller yet to have a capability of providing high performance such as high resolution, color, and video rate pictures. One popular style of such portable electronic devices is a clam-shell style, which has a closed position and an opened position and commonly includes two displays having one display for the closed position and another for the opened position. The display for the closed position is externally viewable but typically has reduced display capabilities such as no color, less display area, and less resolution; and the display for the opened position is generally the main display typically having a larger display area than the externally viewable display and supports the full display functionality.

However, although useful and desirable, having two displays in a portable electronic device increases the size of the portable electronic device, most noticeably in thickness. Further, to make both displays readable in darkness, a light source such as a back-light for each display is needed, which further adds thickness to the portable electronic device.

DETAILED DESCRIPTION OF THE PREFERRED EMBODIMENTS

A two-way trans-reflective display provides two viewable sides without requiring the use of thinner glass pane, two-way light guide, or two displays positioned back to back, which results in a thinner and lighter display. Each pixel of the two-way trans-reflective display comprises a light modulation medium such as a liquid crystal material, which is driven by a modulating media driving mechanism to alter its optical property, sandwiched between first and second transparent layers. The first transparent layer has a first light absorber on the light modulation medium partially covering the first transparent layer, and a first light reflector over the first light absorber. The second transparent layer is similarly constructed and has a second light absorber on the liquid modulation medium side partially covering the second transparent layer, and a second light reflector over the light absorber. This combination allows light entering through the first transparent layer to be partially reflected by the second reflector to provide a first image through the first transparent layer, and be partially transmitted to provide a second image through the second transparent layer. Further, light entering through the second transparent layer is partially reflected by the first reflector to enhance the second image, and is also partially transmitted to enhance the first image. The light entering through the first transparent layer can be provided by ambient light or by a light source which is a part of the two-way trans-reflective display. The light source may provide color light such as a red-green-blue ("RGB") light and field sequential light for providing a color image. The use of the field sequential light, which is synchronized with a display refresh cycle, eliminates the necessity of using color filters allowing a use of a larger pixel size, or a higher aperture ratio, which in turn, provides less light loss compared to the pixels designed for the RGB light. With the pixel designed for the field sequential light, an additional reflector can be inserted in the pixel. Combined with the advantage of less light loss, the pixel designed for the field sequential light, and the display comprising of such pixels, is viewable with the ambient light.

Figure 1:
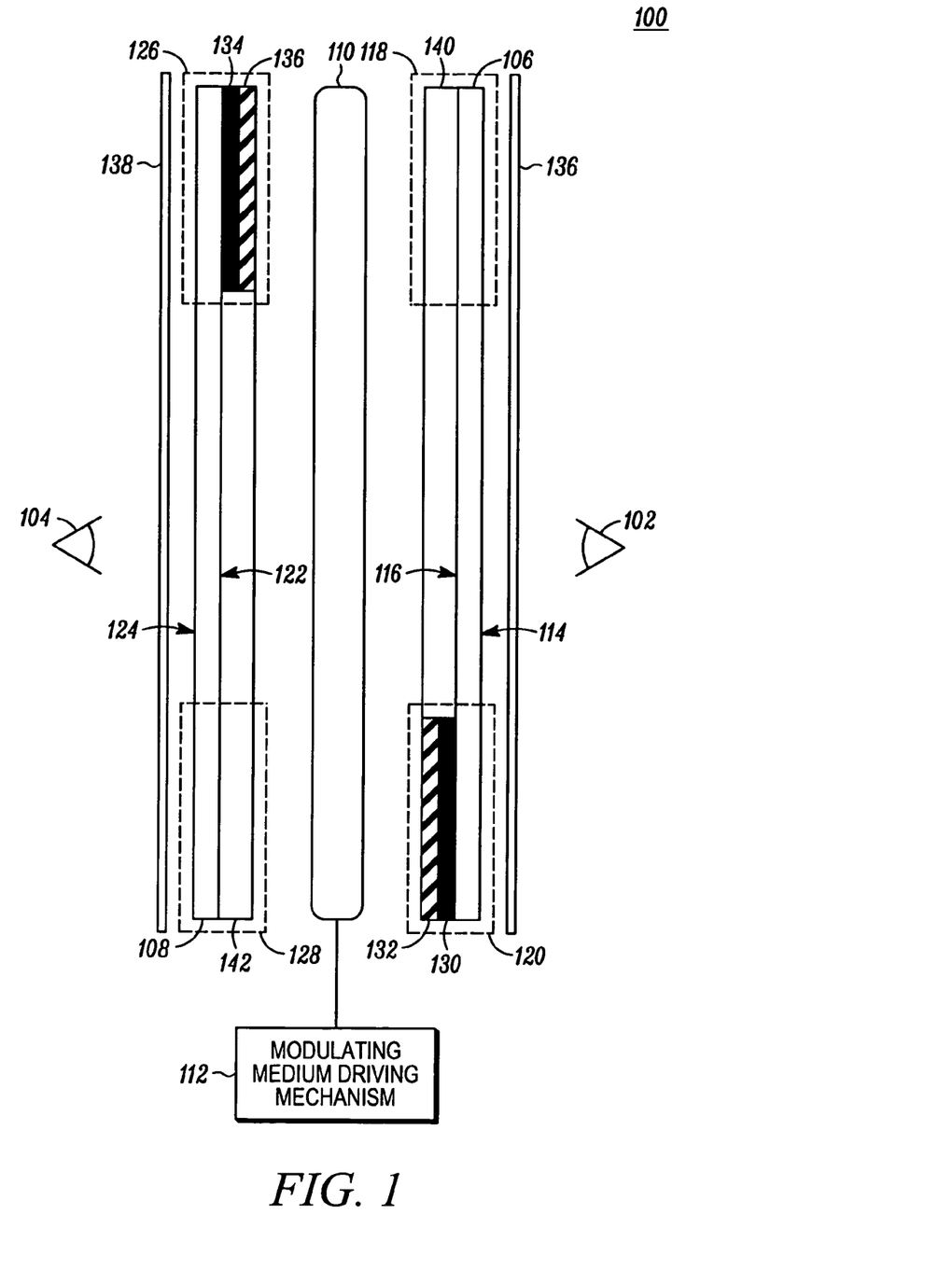
FIG. 1 is an exemplary block diagram of a two-way trans-reflective display pixel in accordance with at least one of the preferred embodiments.

FIG. 1 is an exemplary block diagram of a two-way trans-reflective display pixel 100 in accordance with at least one of the preferred embodiments. The two-way trans-reflective display pixel 100 has first and second viewable sides 102 and 104, and includes a first transparent layer 106, a second transparent layer 108, a light modulation medium 110, such as a liquid crystal material, sandwiched between the first and second transparent layers 106 and 108, and a modulating medium driving mechanism 112 coupled to the light modulation medium 110 to alter optical property of the light modulation medium 110. The first and second transparent layers 106 and 108 are typically made of glass. The first transparent layer 106 has a first front side 114, a first back side 116 opposite to the first front side 114, a first top portion 118, and a first bottom portion 120 opposite to the first top portion 118. The second transparent layer 108 has a second front side 122 facing the first back side 116, a second back side 124 opposite to the second front side 122, a second top portion 126, and a second bottom portion 128 opposite to the second top portion 126. A first light absorber 130 is disposed on the first back side 116 at the first bottom portion 120, and a first reflector 132 is disposed on the first light absorber 130. A second light absorber 134 is disposed on the second front side 122 at the second top portion 126, and a second reflector 136 is disposed on the second light absorber 134. The two-way trans-reflective display pixel 100 may further include a first polarizer 136 disposed on the first front side 114, a second polarizer 138 disposed on the second back side 124, a first transparent electrode 140 disposed on the first back side 116, and a second transparent electrode 142 disposed on the second front side 122. The first and second transparent electrodes 140, 142 may be coupled to the modulating medium driving mechanism 112 to effectuate the optical property alteration of the light modulation medium 110. Further, a color filter may be disposed on each of the first and second transparent layers 106 and 108.

Figure 2:
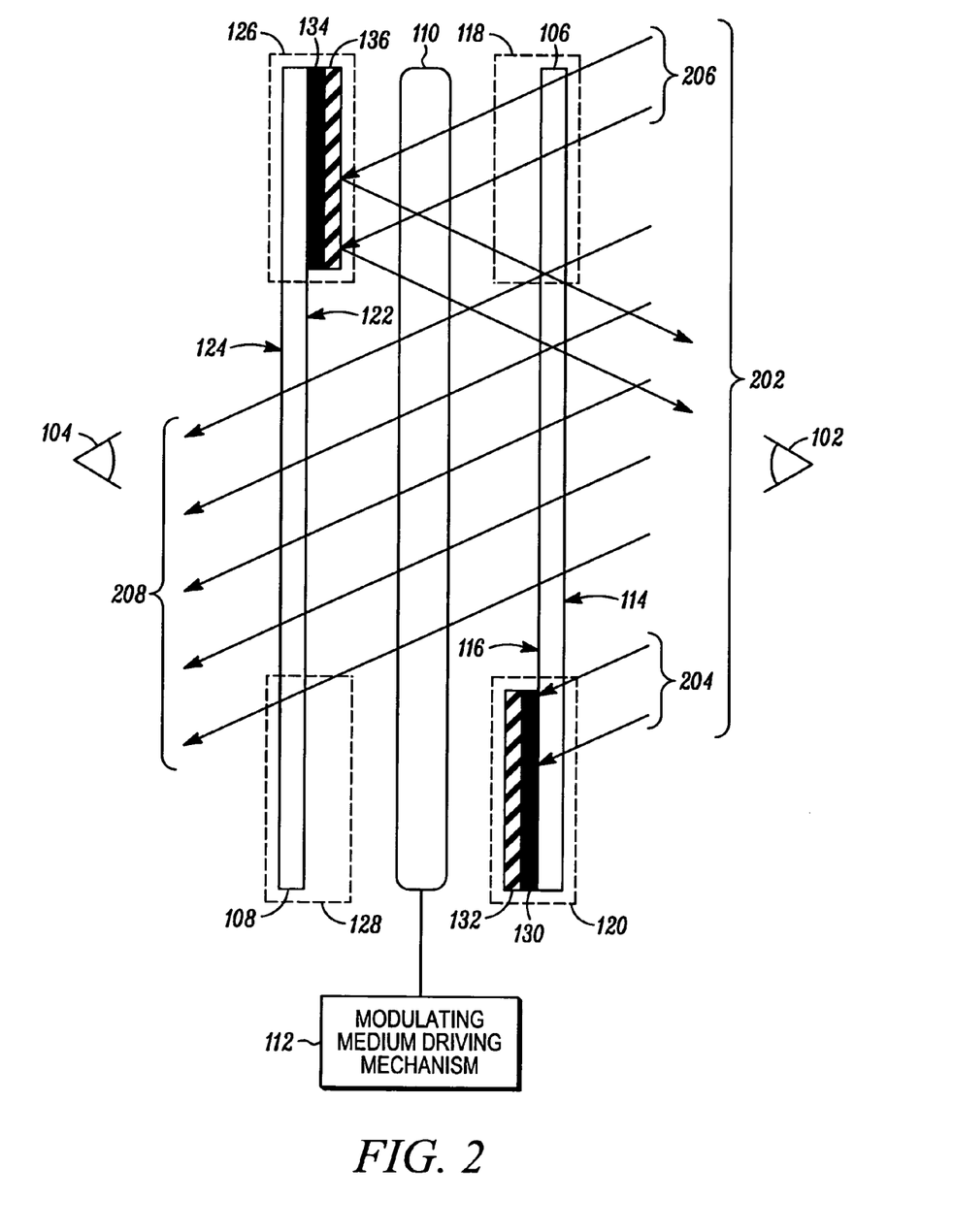
FIG. 2 is an exemplary block diagram representation of an operation of the two-way trans-reflective display pixel based upon light entering through the first front side.

FIG. 2 is an exemplary block diagram representation 200 of an operation of the two-way trans-reflective display pixel 100 based upon light 202 entering through the first front side 114. For a reflective operation for the first viewable side 102, the first light absorber 130 absorbs a portion 204 of light 202 entering through the first front side 114, and the second reflector 136 reflects another portion 206 of the light 202 entering through the first front side 114. The reflected light 206 is effective in producing a first image for the first viewable side 102. With a color filter disposed on the first transparent layer 106, the first image for the first viewable side 102 would be in color. For a transmissive operation for the second viewable side 104, a transmitted portion 208 of the light 202 entering through the first front side 114, which is the portion of the light 202 not reflected by the second reflector 136 or absorbed by the first light absorber 130, is effective in producing a second image for the second viewable side 104. With a color filter disposed on the second transparent layer 108, the second image for the second viewable side 104 would also be in color.

Figure 3:
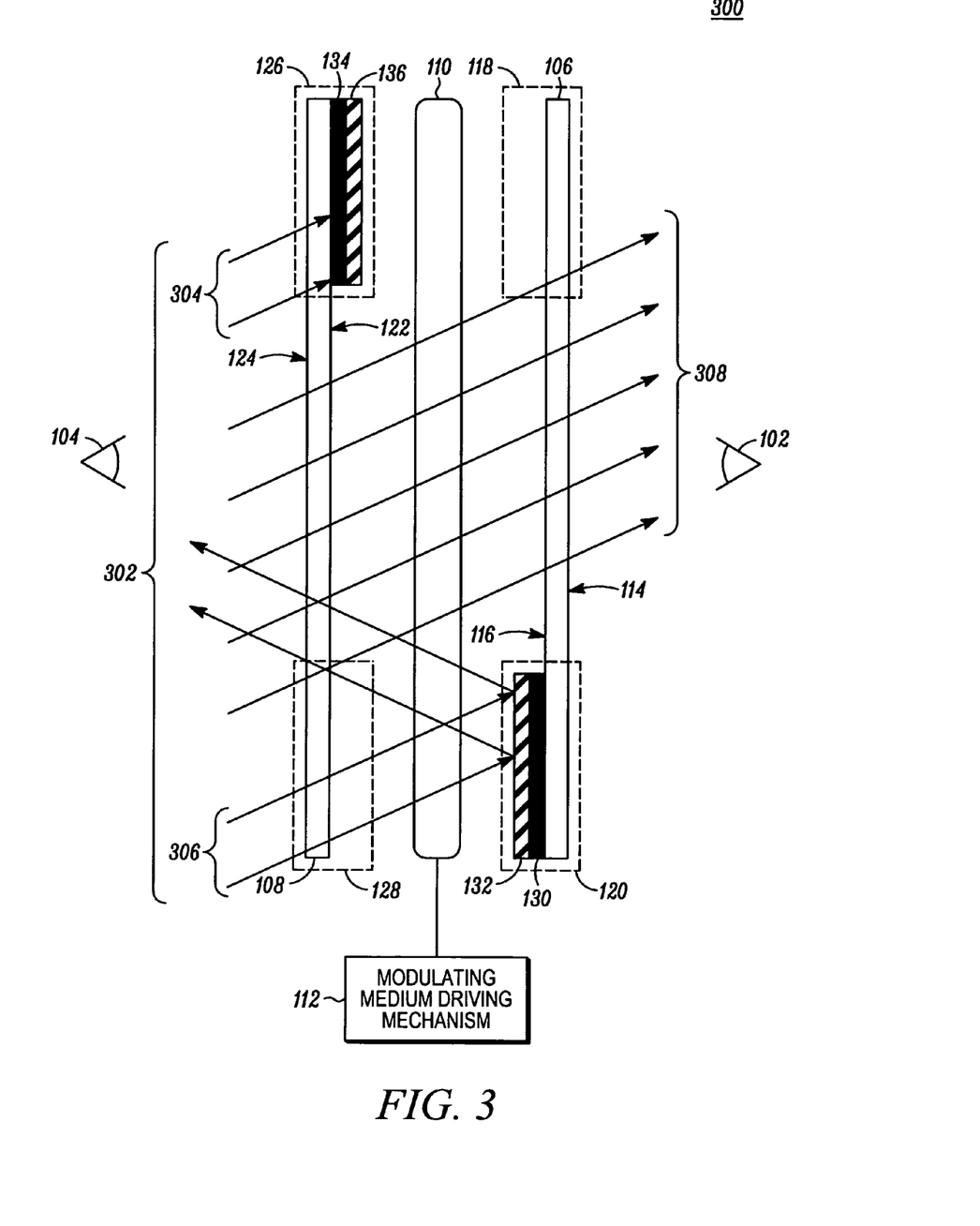
FIG. 3 is an exemplary block diagram representation of an operation of the two-way trans-reflective display pixel based upon light entering through the second back side.

FIG. 3 is an exemplary block diagram representation 300 of an operation of the two-way trans-reflective display pixel 100 based upon light 302 entering through the second back side 124. For a reflective operation for the second viewable side 104, the second light absorber 134 absorbs a portion 304 of light 302 entering through the second back side 124, and the first reflector 132 reflects another portion 306 of the light 302 entering through the second back side 124. The reflected light 306 is effective in producing a first image for the second viewable side 104. For a transmissive operation for the first viewable side 102, a transmitted portion 308 of the light 302 entering through the second back side 124, which is the portion of the light 302 not reflected by the first reflector 132 or absorbed by the second light absorber 134, is effective in producing a second image for the first viewable side 102.

Figure 4:
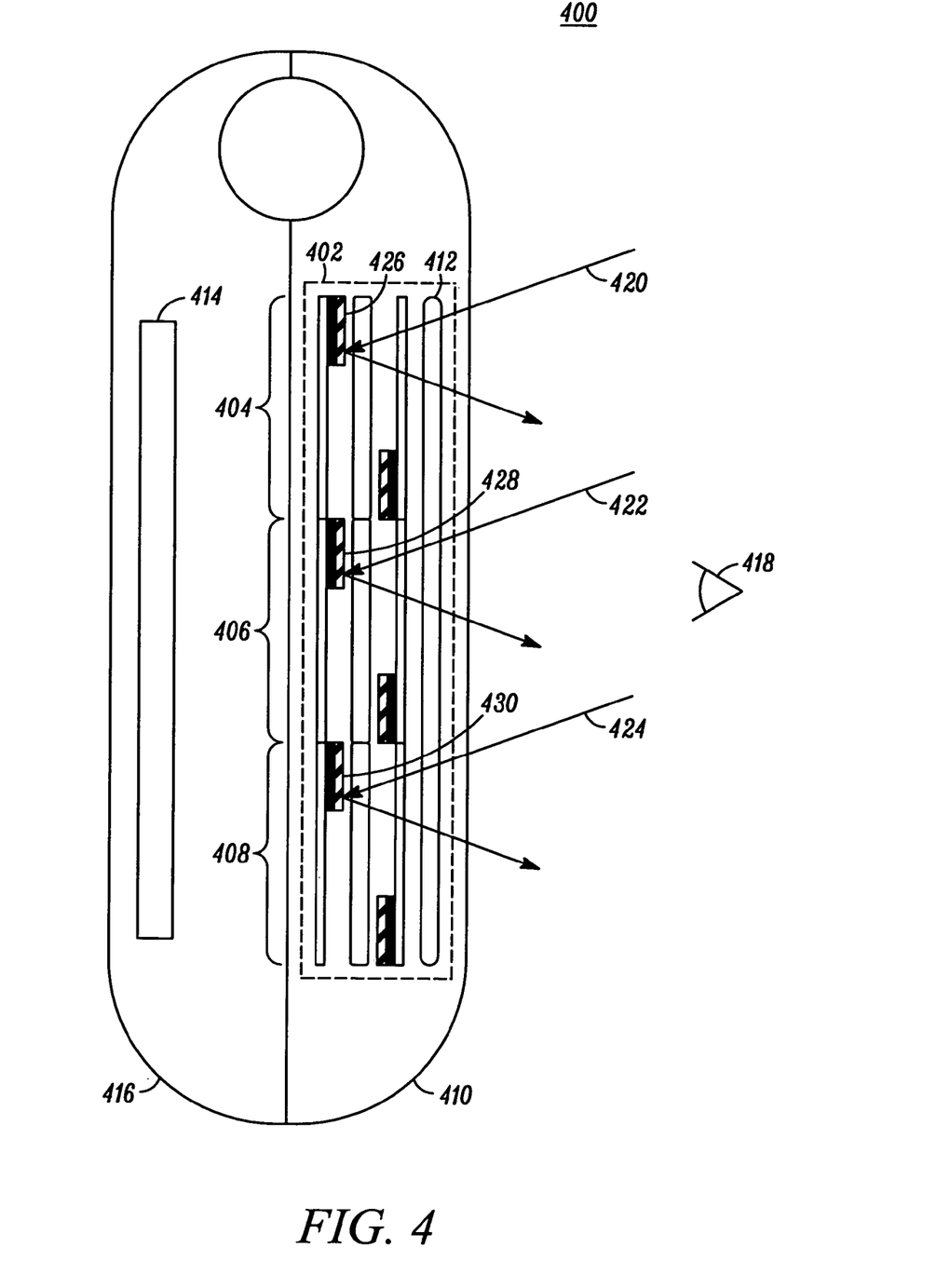
FIG. 4 is an exemplary block diagram of an electronic device, having a two-way trans-reflective display comprising a plurality of two-way trans-reflective display pixels, in a closed position utilizing ambient light in accordance with at least one of the preferred embodiments.

FIG. 4 is an exemplary block diagram of an electronic device 400 having a two-way trans-reflective display 402 having two viewable sides comprising a plurality of two-way trans-reflective display pixels of FIG. 1 (for simplicity, only three two-way trans-reflective display pixels, 404, 406, and 408 are shown) in accordance with at least one of the preferred embodiments. In this example, the electronic device 400 is illustrated as a foldable electronic device and the two-way trans-reflective 402 is housed in a first housing portion 410 of the electronic device 400 along with a transparent light source 412. The transparent light source 412 may provide red-green-blue ("RGB") colors, which may be field-sequentially delivered to the plurality of two-way trans-reflective display pixels 404, 406, and 408. The transparent light source 412 may comprise a light source such as a light emitting diode ("LED") and a transparent light guide. Various electronic circuits and modules 414, such as a processor, memory, display driver, user interface and other necessary circuits and modules in operating the electronic device 400, may be housed in a second housing portion 416 of the electronic device 400. As shown in FIG. 4, the electronic device 400 is in a closed position, and the two-way trans-reflective display 402 is viewable only from a first viewable side 418. Ambient light 420, 422, and 424 entering from the first viewable side 418 is reflected by reflectors 426, 428, and 430, and produces a black-and-white image viewable from the first viewable side 418.

Figure 5:
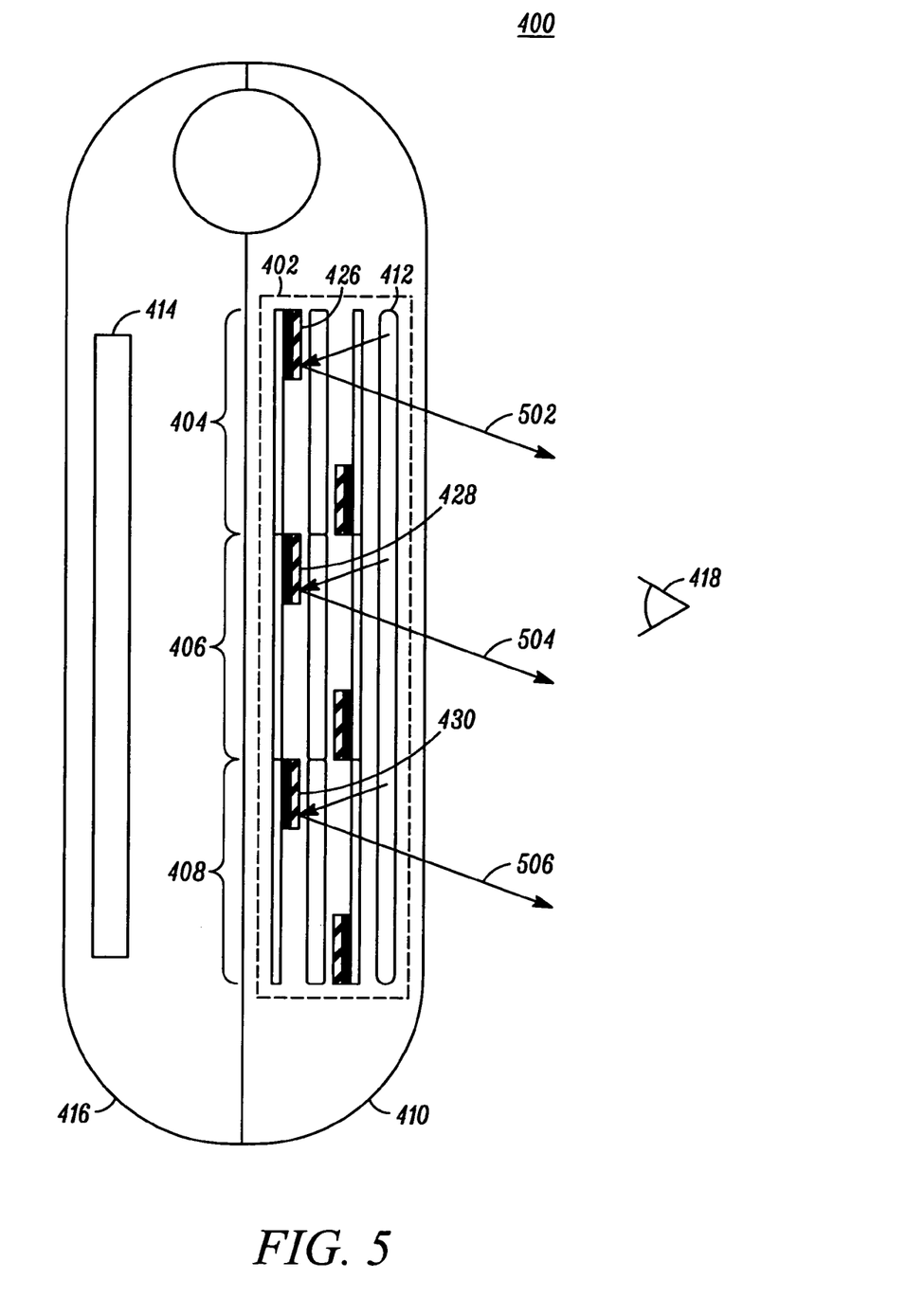
FIG. 5 is an exemplary block diagram of the electronic device in the closed position utilizing color light from a light source in accordance with at least one of the preferred embodiments.

FIG. 5 is an exemplary block diagram of the electronic device 400 also in the closed position. However, light 502, 504, and 506 reflected by the reflectors 426, 428, and 430 is produced by the transparent light source 412 having colors, resulting in a viewable color image from the first viewable side 418.

Figure 6:
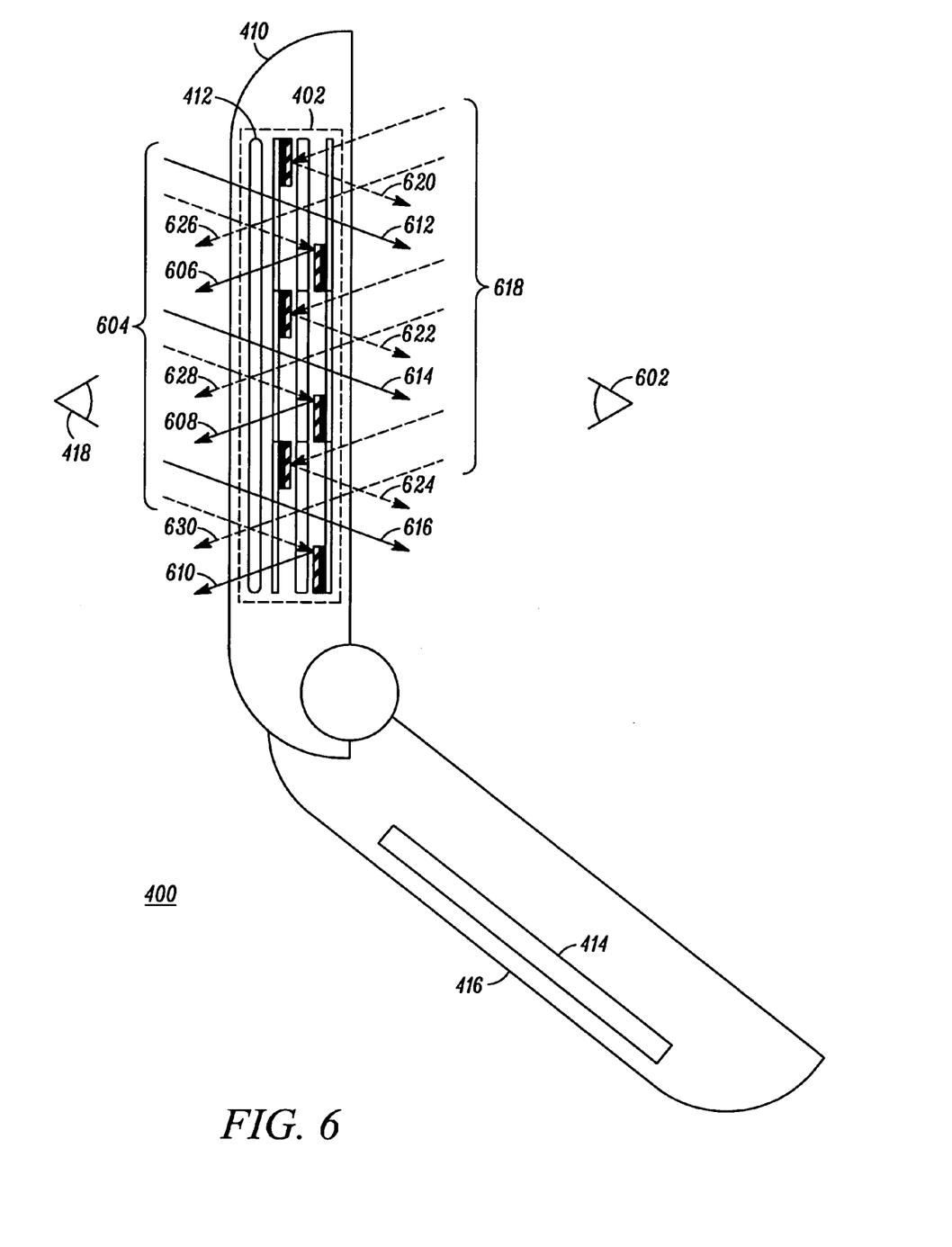
FIG. 6 is an exemplary block diagram of the electronic device in an opened position utilizing ambient light in accordance with at least one of the preferred embodiments.

FIG. 6 is an exemplary block diagram of the electronic device 400 in an opened position utilizing ambient light in accordance with at least one of the preferred embodiments. In the opened position, the two-way trans-reflective display 402 is now viewable from the first viewable side 418 and a second viewable side 602. As described in FIG. 4, the ambient light 604 entering from the first viewable side 418 is partially reflected, partially transmitted and partially absorbed by the two-way trans-reflective display 402. The reflected ambient light 606, 608, and 610 entering from the first viewable side 418 produces a black-and-white image viewable from the first viewable side 418. The transmitted light 612, 614, and 616 entering from the first viewable side 418 produces a black-and-white image viewable from the second viewable side 602. The ambient light 618 entering from the second viewable side 602 is also partially reflected, partially transmitted and partially absorbed by the two-way trans-reflective display 402. The reflected ambient light 620, 622, and 624 entering from the second viewable side 602 produces a black-and-white image viewable from the second viewable side 602, which may enhance the black-and-white image produced by the transmitted light 612, 614, and 616 entering from the first viewable side 418. The transmitted light 626, 628, and 630 entering from the second viewable side 602 produces a black-and-white image viewable from the first viewable side 418, which may enhance the black-and-white image produced by the reflected light 606, 608, and 610 entering from the first viewable side 418. Thus, the two-way trans-reflective display 402 is viewable with ambient light from two opposing sides, the first viewable side 418 and the second viewable side 602.

Figure 7:
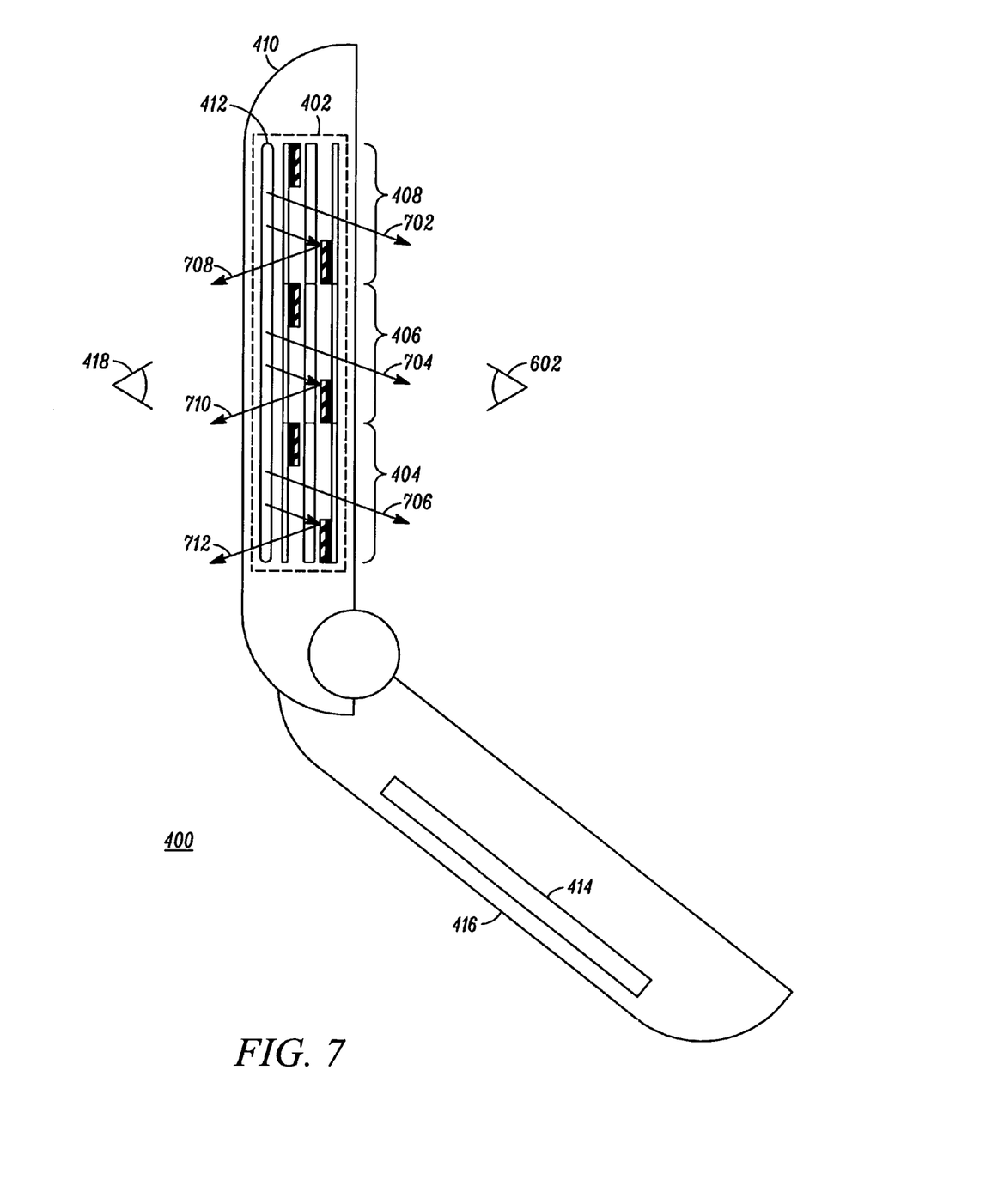
FIG. 7 is an exemplary block diagram of the electronic device in the opened position utilizing color light from the light source in accordance with at least one of preferred embodiments.

FIG. 7 is an exemplary block diagram of the electronic device 400 in the opened position utilizing color light from the light source 412 in accordance with at least one of the preferred embodiments. The color light generated by the transparent light source 412 is partially reflected, partially transmitted and partially absorbed by the two-way trans-reflective display 402. The transmitted color light 702, 704, and 706 from the transparent light source 412 produces a color image viewable from the second viewable side 602. The reflected color light 708, 710, and 712 from the transparent light source 412 produces a color image viewable from the first viewable side 418. Thus, one light source, the transparent light source 412, enables the two-way trans-reflective display 402 to be viewable from two sides, the first viewable side 418 and the second viewable side 602.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A two-way trans-reflective display pixel having two viewable sides, the two-way trans-reflective display pixel comprising:

a first transparent layer, the first transparent layer having a first front side, a first back side opposite to the first front side, a first top portion and a first bottom portion opposite to the first top portion;

a second transparent layer, the second transparent layer having a second front side, a second back side opposite to the second front side, a second top portion and a second bottom portion opposite to the second top portion, the second front side facing the first back side;

a light modulation medium disposed between the first and second transparent layers, the light modulation medium capable of switching between transparent and opaque states;

a first light absorber disposed on the first back side at the first bottom portion, the first light absorber configured to absorb a portion of light entering through the first front side;

a first reflector disposed on the first light absorber, the first reflector configured to reflect a portion of light entering through the second back side;

a second light absorber disposed on the second front side at the second top portion, the second light absorber configured to absorb a portion of the light entering through the second back side;

a second reflector disposed on the second light absorber, the second reflector configured to reflect a portion of the light entering through the first front side;

a first transparent electrode disposed on the first back side; and a second transparent electrode disposed on the second front side.

2. The two-way trans-reflective display pixel of claim 1, wherein the light modulation medium is liquid crystal.

3. The two-way trans-reflective display pixel of claim 1, further comprising:
   a first polarizer disposed on the first front side; and
   a second polarizer disposed on the second back side.

4. The two-way trans-reflective display pixel of claim 1, further comprising:
   a modulating medium driver mechanism coupled to the first and second transparent electrodes, the modulating medium driver mechanism configured to provide a driving signal to the first and second transparent electrodes, the driving signal effective in switching the light modulating medium between transparent and opaque states.

5. A two-way trans-reflective display having front and back display sides configured to display an image viewable from the front and back display sides, the two-way trans-reflective display having a first transparent substrate, a second transparent substrate, a light modulating medium sandwiched between the first and second transparent substrates, a segmented transparent electrode and a thin film transistor array disposed between the first transparent substrate and the light modulating medium, and a common transparent electrode disposed between the second transparent substrate and the light modulating medium, the segmented transparent electrodes forming a plurality of two-way trans-reflective display pixels, each of the plurality of two-way trans-reflective display pixels comprising:
   a first light absorber disposed between the first transparent substrate and the light modulating medium;
   a first reflector disposed between the first light absorber and the light modulating medium;
   a second light absorber disposed between the second transparent substrate and the light modulating medium;
   a second reflector disposed between the second light absorber and the light modulating medium; and
   a modulating medium driver mechanism coupled to the segmented transparent electrode and the common electrode, the modulating medium driver mechanism configured to alter an optical property of each of the plurality of two-way trans-reflective display pixels.

6. The two-way trans-reflective of claim 5, further comprising:
   a first polarizer disposed on the first transparent substrate; and
   a second polarizer disposed on the second transparent substrate.

7. The two-way trans-reflective display of claim 5, wherein the light modulation medium is liquid crystal.

8. The two-way trans-reflective liquid crystal display of claim 5, further comprising:
   a transparent light source disposed on the front display side, the transparent light source configured to provide light entering through the front display side.

9. The two-way trans-reflective liquid crystal display of claim 8, wherein the transparent light source provides color light.

10. The two-way trans-reflective liquid crystal display of claim 8, wherein the transparent light source provides field sequential color light, the field sequential color light synchronized with a display refresh cycle.

11. The two-way trans-reflective of claim 5, wherein a portion of light entering through the first transparent substrate reflected by the second reflectors of the plurality of two-way trans-reflective display pixels and is effective in generating a first image of the light modulating medium through the front display side.

12. The two-way trans-reflective of claim 11, wherein a portion of the light entering through the first transparent substrate not reflected by the second reflectors of the plurality of two-way trans-reflective display pixels and not absorbed by the first light absorbers of the plurality of two-way trans-reflective display pixels is effective in generating a second image of the light modulating medium through the back display side.

13. The two-way trans-reflective of claim 5, wherein a portion of light entering through the second transparent substrate reflected by the first reflectors of the plurality of two-way trans-reflective display pixels is effective in providing a first image of the light modulating medium through the back display side.

14. The two-way trans-reflective of claim 13, wherein a portion of the light entering through the second transparent substrate not reflected by the first reflectors of the plurality of two-way trans-reflective display pixels and not absorbed by the second light absorbers of the plurality of two-way trans-reflective display pixels is effective in providing a second image of the light modulating medium through the front display side.

15. A method for producing a bi-directionally viewable image in a liquid crystal display pixel, the method comprising:
   partially reflecting light entering from a front side of the liquid crystal display pixel;
   providing a first viewable image of the bi-directionally viewable image through the front side using the partially reflected light;
   allowing a portion of the light entering from the front side to transmit through the liquid crystal display pixel; and
   providing a second viewable image of the bi-directionally viewable image through a back side of the liquid crystal display pixel using the transmitted light.

16. The method of claim 15, further comprising:
   partially reflecting light entering from the back side of the liquid crystal display pixel;

augmenting the second viewable image of the bi-directionally viewable image through the back side using the partially reflected light entering from the back side of the liquid crystal display pixel;

allowing a portion of the light entering from the back side to transmit through the liquid crystal display pixel; and augmenting the first image of the bi-directionally viewable image through the front side of the liquid crystal display pixel using the transmitted light entering from the back side of the liquid crystal display pixel.

17. The method of claim 15, wherein the light entering from the front side of the liquid crystal display pixel includes color light generated by a light source.

18. The method of claim 17, wherein in the light source provides field sequential color light, the field sequential color light synchronized with a display refresh cycle.

* * * * *